Figure 1:
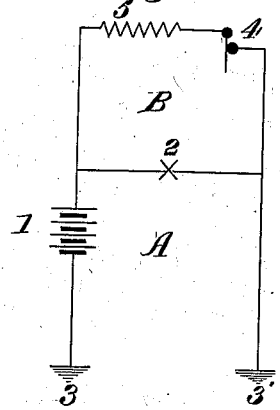

No. 814,942. PATENTED MAR. 13, 1906.
A. F. COLLINS.
WIRELESS TELEPHONY.
APPLICATION FILED AUG. 21, 1905.

3 SHEETS—SHEET 1.

WITNESSES:
Jos. A. Ryan.
Edw. W. Byrn.

INVENTOR
Archie Frederick Collins
BY Munn & Co.,
ATTORNEYS

No. 814,942. PATENTED MAR. 13, 1906.
A. F. COLLINS.
WIRELESS TELEPHONY.
APPLICATION FILED AUG. 21, 1905.

3 SHEETS—SHEET 2.

WITNESSES:
Jos. A. Ryan
Edw. W. Byrn.

INVENTOR
Archie Frederick Collins
BY Munn & Co.
ATTORNEYS

No. 814,942. PATENTED MAR. 13, 1906.
A. F. COLLINS.
WIRELESS TELEPHONY.
APPLICATION FILED AUG. 21, 1905.
3 SHEETS—SHEET 3.
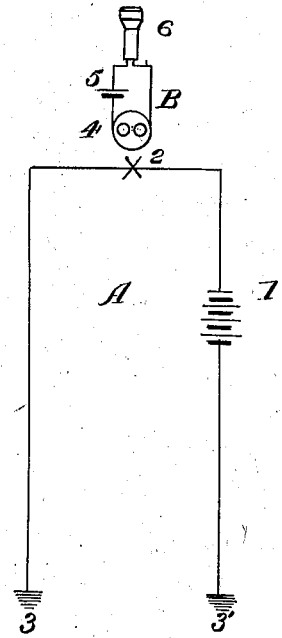
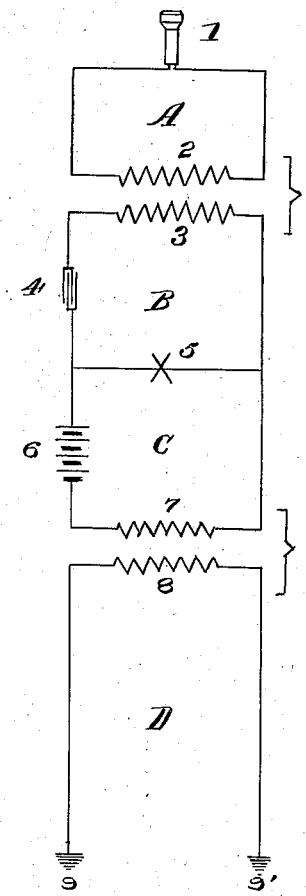
WITNESSES:
Jos. A. Ryan.
Edw. W. Byrn.
INVENTOR
Archie Frederick Collins.
BY Munn & Co.
ATTORNEYS

UNITED STATES PATENT OFFICE.

ARCHIE FREDERICK COLLINS, OF NEW YORK, N. Y.

WIRELESS TELEPHONY.

No. 814,942.            Specification of Letters Patent.            Patented March 13, 1906.

Application filed August 21, 1905. Serial No. 275,026.

*To all whom it may concern:*

Be it known that I, ARCHIE FREDERICK COLLINS, a citizen of the United States, and a resident of New York city, borough of Manhattan, in the county and State of New York, have invented new and useful Improvements in Wireless Telephony, of which the following is a specification.

My invention relates to the art of transmitting and receiving articulate speech electrically between two or more stations without connecting-wires, but employing the earth or other medium as a means of propagation; and it relates more particularly to the transmission of impulses into the earth or other medium by means of a direct or alternating current having a higher voltage and greater amperage than it has been found possible to employ heretofore and the reception of these impulses and their amplification and intensifications at the receiving-station.

It is well known to those versed in the art that if a telephone-transmitter, a source of electromotive force, and the earth or other medium are connected in series by terminal conductors entering the earth any variation of the current due to resistance changes in the transmitter will produce a difference of potential at the terminal conductors forming contact with the earth or other medium and when a difference of potential is established at the two terminals connected to the earth a current is established in the circuit of which the earth forms a portion. Equipotential surfaces are established around each terminal, and while the greater portion of the current flows directly between the terminals a certain portion taking a less direct path flows from one to the other in arc-shaped paths extending from the conductors a considerable distance, or this arrangement may be so modified that an alternating current may be made to produce the same results—*e. g.*, a transmitter and a source of electromotive force are connected in series with the primary of a simple transformer-coil the terminals of the secondary of which are connected with the terminal conductors leading to the earth or other medium, in which case the resistance changes in the transmitter cause the current in the primary circuit to create, according to the law of induction, an alternating current in the secondary circuit of which the earth or other medium forms a portion.

Heretofore no provision has been made for amplifying or intensifying the received pulsations emitted by the transmitters described, and a simple telephone-receiver has been employed to pick up and translate the impulses into speech. Likewise all experiments in wireless telephony using conductor-terminals embedded in the earth or other medium have been made by means of ordinary telephone-transmitters, which in commercial practice operate approximately on twenty-five volts and one-half ampere. Using of necessity a transmitter having this limitation wireless telephony by this method has been successful over comparatively short distances, since where a current in excess of that stated is used it burns out the transmitter.

Now the object of my invention is to obviate this difficulty and to provide for the use of any voltage and any amperage without regard to the transmitter proper, and in so doing I render the transmitter absolutely independent of the current traversing the earth or other medium and I also amplify the received impulses so that the reproduced speech will be louder and more distinct than heretofore.

Figures 1, 2, 3, and 4 show diagrammatically various modifications of the transmitter arranged in accordance with my invention, and Figs. 5, 6, 7, 8, 9, and 10 are modifications of my receiver.

Figure 2:
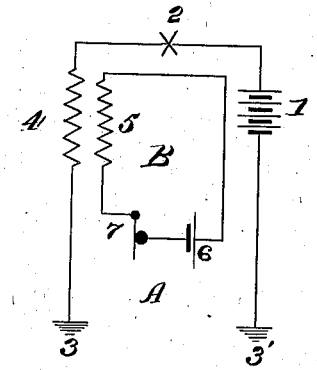
Figure 3:
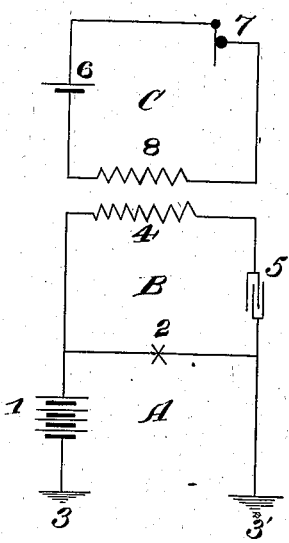
Figure 4:
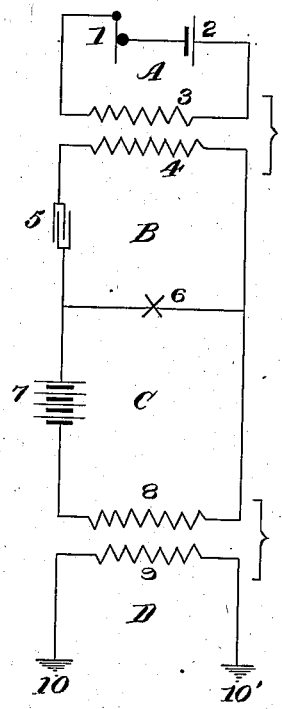

My method of transmitting consists, substantially, in modifying a current (of sufficient electromotive force to produce an arc-light between the electrodes of any conducting material, such as pencils of carbons or substances employed in the production of arc-lights) by means of either shunting the current, as shown in Fig. 1, or by superimposing a direct or alternating current on the circuit including the arc-light, as shown in Figs. 2, 3, and 4.

In Fig. 1 the circuit represented by A consists of a source of electromotive force 1, the arc-light 2, and the conductor-terminals 3 3', forming connection with the earth or other medium. In parallel with this circuit, which may be designated as the "heavy-current" circuit, is the shunt-circuit B, derived from the heavy-current circuit A and in which is included a telephone-transmitter 4 and a resistance 5. Any modification of the derived circuit B by virtue of a change of resistance due to a variable pressure of the diaphragm is impressed upon the circuit A, and the temperature of the arc and its resistance indicates a corresponding and proportionate change in the circuit A. This variation of resistance in the arc produces in the circuit which includes it electrical undulations in the earth or other medium.

In a second modification of my method (shown in Fig. 2) the heavy-current circuit A includes a source of electromotive force 1, the arc-light 2, and the conductor-terminals 3 3', forming connection with the earth or other medium in which they are embedded and one of the windings 4 of a transformer-coil. The circuit B is separated mechanically from the circuit A, but is in inductive association with it through the complementary winding of the coil, as shown at 5. The circuit B includes the winding 5, battery 6, and transmitter 7. When the transmitter 7 is in operation, an undulatory current is set up and superimposed on the current in the circuit A, and the current is varied as indicated with reference to Fig. 1.

A third modification is shown in Fig. 3. In this case the current flowing in the circuit A is varied by an alternating current set up in the circuit B, which includes a winding of a transformer-coil 4 and a condenser 5. A third circuit C includes a battery-cell 6, a telephone-transmitter 7, and a winding 8 of the transformer. It is the undulations of the current in this circuit which produce the alternating current in the circuit B.

A fourth modification of this method is shown in Fig. 4 and has for its object the production of alternating currents in the circuit which includes the earth or other medium. By referring to Fig. 4, A B C D indicate separate circuits. The primary circuit (represented by A) includes a telephone-transmitter 1, a source of electromotive force 2, and the winding 3 of a transformer-coil. The secondary circuit B includes the complementary coil 4 of the transformer, a condenser 5, and the arc-light 6. The third circuit C is in parallel with the circuit B and includes the arc-light 6, a source of electromotive force 7, which feeds the arc, and the primary winding 8 of a transformer. The fourth circuit D includes the secondary 9 of the transformer and the conductor-terminals 10 10', embedded in the earth or other medium which completes the circuit.

In action the direct current from the source of electromotive force 2 is changed into an undulatory current by means of the transmitter 1 in the circuit A. This sets up an alternating current in the circuit B by means of the transformer 3 4, and this current is then superimposed upon the current flowing in C feeding the arc-light. Every imposition of the alternating undulatory current flowing in C produces identically the same effect upon the circuit D that the current in the circuit A has upon B, with the final result that an alternating current having the same frequency and phase as that produced in the circuit B, but with its amplitude greatly increased, is made to pass through the circuit including the earth or other medium in which conductor-terminals are embedded.

It is obvious that many other modifications of my method of transmission may be made, but the results obtained will be the same. It is likewise obvious that my system may be employed for signaling without wires, provided a telegraph-key is substituted for the telephone-transmitter indicated in the text.

In connection with my method of transmitting articulate speech without connecting-wires there may be employed as a receiving device a simple telephone-receiver having its conductor-terminals embedded in the earth or other medium. When such a receiver is employed, the received impulses will have a value corresponding to the sensibility of the instrument.

Figure 5:
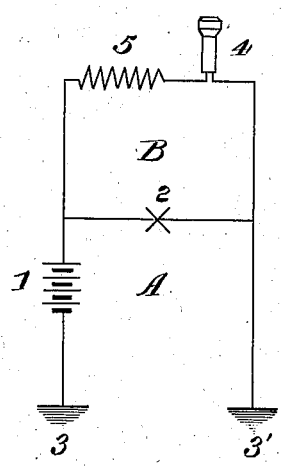

Now to further increase the amplitude and intensity of the impulses, so that the reproduction of speech may be louder, and without increasing the sensitiveness of the receiving-telephone I employ a method shown in Fig. 5, of which Figs. 6, 7, 8, 9, and 10 are modifications.

Fig. 5 shows my invention in its simplest form. The circuit A includes a source of electromotive force, an arc-light 2, and conductor-terminals 3 3', embedded in the earth or other medium. The circuit B is derived from A, which is in parallel to it and includes a telephone-receiver 4 or other means of indication and a resistance 5. When in operation, the function of this receiver is as follows: The received impulses through the earth or other medium are superimposed and impressed upon the current flowing in the circuit A, which includes the source of electromotive force 1, the arc-light 2, and the conductor-terminals 3 3', embedded in the earth or other medium. These superimposed impulses vary the resistance of the arc 2 and increase the variations of the current from the generator 1 flowing through the circuits A and B. The receiver 4 in the circuit B is protected from excessive voltage by means of the resistance 5, and the circuit B (since it is in parallel with the circuit A) derives its energy from that circuit, and the telephone-receiver 4 responds to changes in the circuit A, but with augmented amplitude and intensity.

Figure 6:
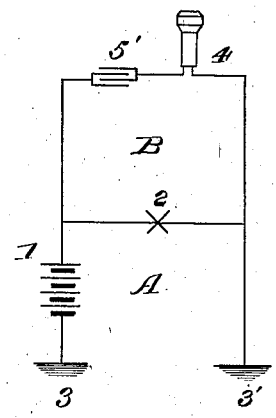

In Fig. 6 the circuit B includes a condenser 5', in series with the transmitter instead of the resistance 5, (shown in Fig. 5,) which precludes the flow of the direct current in the circuit A through the receiver 4, but permits alternating impulses to act upon it, or a combination may be effected by including the receiver 4, the resistance 5 of Fig. 5, and the condenser 5′, Fig. 6, in the circuit B.

Figure 7:
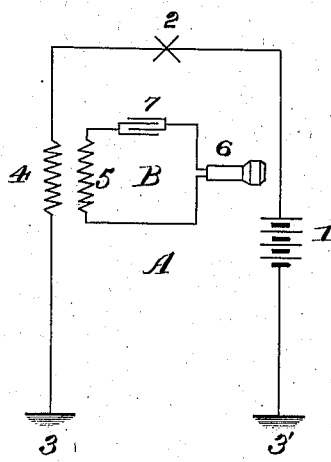

Fig. 7 illustrates a modification of my invention in which two distinct circuits are represented by A B. The circuit A includes a source of electromotive force 1, an arc-light 2, conductor-terminals 3 3′, embedded in the earth or other medium, and one winding 4 of a transformer-coil. The circuit B includes the opposite winding 5 of the transformer-coil, a telephone-receiver 6, and a condenser 7. This arrangement removes the telephone-receiver from the circuit A, and thus insures its safety.

Figure 8:
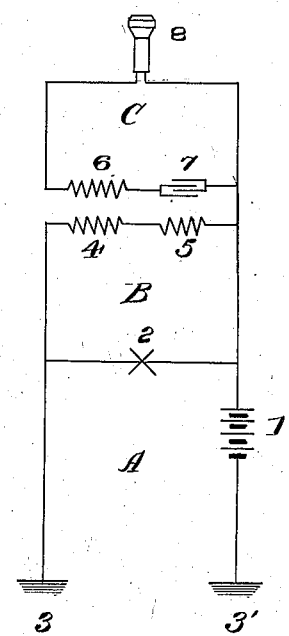

Fig. 8 shows a form of my receiver in which the circuit A includes a source of electromotive force 1, an arc-light 2, and conductor-terminals 3 3′, embedded in the earth or other medium. The circuit B is in parallel with the circuit A and includes the primary 4 of a transformer and a resistance 5, or a condenser may be substituted instead. The circuit C includes the winding 6 of a transformer, condenser 7, and a receiver 8.

Fig. 9 shows diagrammatically the arrangement I employ for utilizing the well-known properties of selenium. The circuit A consists of a source of electromotive force 1, an arc-light 2, and conductor-terminals 3 3′, embedded in the earth or other medium. The circuit B is mechanically and electrically removed from the circuit A, but is influenced by means of the variation of light intensities of the arc 2 acting on a selenium-cell 4, which is included in the circuit B, together with a source of electromotive force 5 and a telephone-receiver 6 or other means of indication.

Another form of receiver is shown in Fig. 10. In this modification of my invention a receiver 1 is connected in series with the secondary 2 of a transformer forming the circuit A. The secondary circuit B includes one winding 3 of the transformer-coil, a condenser 4, and the arc-light 5. This circuit is in parallel with and derived from the circuit C, which includes the arc-light 5, the source of electromotive force 6, and one winding 7 of the transformer-coil. The circuit D includes the complementary winding 8 of the transformer-coil and the conductor - terminals 9 9′. In action the function of these various factors are as follows: The impulses propagated through the earth or other medium are impressed upon the circuit D and are transferred by the transformer 7 8 to circuit C. The resistance of the said circuit is varied, as before stated, and undulatory currents flow in the derived circuit B, and these are transformed into alternating currents in the circuit A in which the receiver 1 is placed, and as a result of these operations the amplitude of the current and its intensity is increased beyond the maximum value impressed upon the circuit D.

In defining my invention with greater clearness I would state that I am aware that the so-called "speaking-arc" is not new, and I do not claim that broadly, but only the combination of the speaking-arc and the dispersion method herein shown and described.

It will be seen from a comparison of Figs. 1 and 5 that the same instrumentalities may serve for both a transmitting-station and a receiving-station, and in referring generically to the transmitter 4 of Fig. 1 and receiver 4 of Fig. 5 in the claim I employ the generic term of "sound-converter," meaning thereby any means for converting sound-waves into electrical waves or electrical waves into sound-waves.

Having thus described my invention, what I claim as new, and desire to secure by Letters Patent, is—

1. In a wireless telephone or telegraph the combination of a source of electromotive force, an arc-light, a circuit connecting the same and having the conductor - terminals embedded in the earth or other medium, and a circuit containing a sound-converter for transmitting or receiving, said sound-converter being in a circuit of its own outside the main influence of the arc-light circuit, substantially as shown and described.

2. In a wireless telephone or telegraph, the combination of a source of electromotive force, an arc-light, a circuit with terminals forming connection with or embedded in the earth or other medium, and means for modifying the current flowing through the said circuit, said means consisting of an independent circuit containing a sound-converter, substantially as shown and described.

3. In a wireless telephone or telegraph, the combination of a source of electromotive force, an arc-light, a circuit with terminals connecting the same with the earth or other medium, a circuit including the arc-light and containing also a sound-converter for transmitting or receiving substantially as described.

4. In a wireless telephone or telegraph, the combination of a source of electromotive force, an arc-light, a circuit with terminals connecting the same with the earth or other medium, a circuit including the arc-light and containing a resistance and a sound-converter, substantially as shown and described.

5. In a wireless telephone or telegraph, the combination of a transmitter proper, mechanism connected therewith for producing a so-called "speaking-arc," for varying the current forming said arc and producing current impulses, and means for transmitting said current impulses to a natural medium capable of conveying the same to a distance.

6. In a wireless telephone or telegraph, the combination with a transmitting apparatus of the kind described; of a receiving apparatus comprising a source of electromotive force, an arc-light, a circuit connecting the same and having its conductor-terminals embedded in the earth, or other natural mediums, an independent circuit containing a receiver and a source of electromotive force and means for influencing the current in said circuit containing the receiver by the variations in the arc-light, substantially as described.

ARCHIE FREDERICK COLLINS.

Witnesses:
 WALTON HARRISON,
 E. C. NIELSON.